US006807765B2

(12) United States Patent
Watermann

(10) Patent No.: US 6,807,765 B2
(45) Date of Patent: Oct. 26, 2004

(54) BIRD SCARING DEVICE

(75) Inventor: Ulrich Watermann, Georgetown (CA)

(73) Assignee: Bird Control International Inc., Mississauga (CA)

(*) Notice: Subject to any disclaimer, the term of this patent is extended or adjusted under 35 U.S.C. 154(b) by 0 days.

(21) Appl. No.: 10/032,454

(22) Filed: Jan. 2, 2002

(65) Prior Publication Data

US 2003/0121198 A1 Jul. 3, 2003

(51) Int. Cl.⁷ .............................................. A01M 29/00
(52) U.S. Cl. ......................................................... 43/2
(58) Field of Search ..................... 116/22 A; D11/162, D11/137, 157, 141, 97, 130, 172, 181; 43/2, 3; 244/153–154; D21/465, 467, 455; 40/440, 422, 602, 603, 617

(56) References Cited

U.S. PATENT DOCUMENTS

| 942,103 A | * | 12/1909 | Rigney ........................ 273/140 |
| 1,167,502 A | * | 1/1916 | Huffman et al. .......... 116/22 A |
| 1,428,216 A | * | 9/1922 | Chase .......................... 40/417 |
| 2,357,900 A | * | 9/1944 | Lenhardt ..................... 446/11 |
| 2,722,195 A | * | 11/1955 | Rockafeller ............... 116/22 A |
| 3,085,545 A | * | 4/1963 | Ore ........................... 116/22 A |
| 4,074,653 A | | 2/1978 | Pember |
| 4,131,079 A | | 12/1978 | Rousseau, Jr. et al. |
| 4,597,357 A | | 7/1986 | LeMessurier |
| 4,598,660 A | | 7/1986 | Konzak |
| 4,651,457 A | * | 3/1987 | Nelson et al. ................ 428/16 |
| 4,736,907 A | | 4/1988 | Steffen |
| 4,769,794 A | | 9/1988 | Beuter et al. |
| 5,167,199 A | * | 12/1992 | Rehbein ..................... 116/174 |
| 5,181,338 A | | 1/1993 | Chatten |
| 5,322,032 A | * | 6/1994 | Kaleta ........................ 116/209 |
| 5,454,183 A | | 10/1995 | Antonini et al. |
| 5,682,702 A | | 11/1997 | McKnight et al. |
| 5,832,649 A | * | 11/1998 | Kilgore .......................... 43/2 |
| 5,918,404 A | | 7/1999 | Ohba |
| 5,924,387 A | | 7/1999 | Schramer |
| 5,956,880 A | | 9/1999 | Sugimoto |
| 5,986,551 A | | 11/1999 | Pueyo et al. |
| 6,176,047 B1 | | 1/2001 | Morningstar |
| 6,178,673 B1 | * | 1/2001 | Blackford et al. ........... 40/440 |
| 2003/0121198 A1 | * | 7/2003 | Watermann ..................... 43/1 |

FOREIGN PATENT DOCUMENTS

| EP | 127404 A1 | * | 12/1984 | .......... A01M/29/00 |
| JP | 2000354447 A | * | 12/2000 | .......... A01M/29/00 |

OTHER PUBLICATIONS

Merriam–Wewbster's Collegiate Dictionary, 10th ed., pp. 257, 676.*

* cited by examiner

Primary Examiner—Jeffrey L. Gellner

(57) ABSTRACT

A device for scaring birds comprising a silhouette of a bird of prey having at least one hole there through; a first line having one end rotatably attached to said hole.

21 Claims, 6 Drawing Sheets

BIRD SCARING DEVICE

FIELD OF INVENTION

This invention relates to a device for scaring birds and particularly relates to a device for scaring birds utilizing one or more silhouettes of a bird of prey. Furthermore this invention relates to a method of scaring birds including apparatus relating to same.

BACKGROUND ART

The presence of birds in certain locations has in certain circumstances created a hazard or presented an unwanted creature that can impart economic damage.

For example the presence of birds on or near the vicinity of airports and airbases has for many years presented a danger to aircraft. To reduce the hazard of bird strikes on aircraft there have been many devices and methods utilized in order to scare birds away from the vicinity of aircraft. One such method includes the use of live birds of prey, which scare unwanted birds away from aircraft.

Another example of where birds are unwanted are in agricultural fields such as vineyards or the like where the birds peck away at the fruit and plants and create economic damage.

By way of another example it is not uncommon for high buildings such as skyscrapers or the like particularly ones which are predominantly made of glass to present an obstacle for birds flying into such buildings many of whom die and collect at the bottom of said buildings.

Accordingly there have been a variety of apparatus, devices and methods within which to scare birds.

For example U.S. Pat. No. 4,597,376 illustrates a bird scare comprised of a sheet of aluminium suspended by a swivel and having both twist and turn edges to enable sensitive response to rotation in very light rising air as well as rotation on gentle convectional wind and high wind conditions. The sheet material includes domes impressed throughout the material to increase reflective dissipation effect.

Another device is illustrated in U.S. Pat. No. 5,454,183 which relates to an article which comprises a resilient base member and two sections of wire mesh that are joined together where the wire sections interlock with one another along a line running above the centre line of the base member. The base of the article may be bent or otherwise deformed around another structure in order to set up the bird repeller. The base member may be imprinted with the indicia of a bird such as an owl, in order to further deter the roosting of birds.

Furthermore U.S. Pat. No. 5,181,338 illustrates a bird deterrent method and device while U.S. Pat. No. 5,682,702 illustrates a collapsible bird decoy having a planar body panel, shaped like the side silhouette of a bird, and a top panel shaped like a top silhouette of a bird. The body panel and the back panel are adapted to interfit in mutually perpendicular lines to form a body which resembles a birds body when viewed from the sides or above. The wing panel extends generally outwardly from each side of the body formed by interfitting the body panel and back panel. The wing panels are preferably pivotally mounted to the body panel to pivot between a storage position in which the wings extend along the axis of the body panel, and the use position in which the wings stand vertically upwardly and can flex downwardly and outwardly from the body.

Furthermore U.S. Pat. No. 6,176,047B1 illustrates a bird deterring device while U.S. Pat. No. 3,292,319 illustrates a seagull deterrent means which comprises a self-propelled device having a rotatable hub bearing member defining a central axial passageway open at one end and adapted to be freely suspended by means of a shaft positioned within said passageway, a plurality of elongated arm members pivotally mounted and radially disposed on said hub bearing member, said arm member extending traversally from said hub bearing member and having adjacent the end of said arm members concavo-convex shaped members with concave surfaces facing in opposite directions to effect movement of the deterrent means in a horizontal plane.

Moreover U.S. Pat. No. 4,131,079 teaches a device for scaring pests, such as birds from the area to be protected by utilizing an elongated vertically extending post, a resilient wire mounted on and extending from the upper end of the post, and a pair of large thin lightweight highly light reflective discs rotatably suspended from the remote end of the wire in cantilever fashion and responsive to wind forces on the discs in order to provide a random, distracting motion as well as to cast darting light reflections in a random, erratic manner on the area surrounding the post.

Furthermore U.S. Pat. No. 5,956,880 shows an apparatus for flying a flying body imitating a raptor such as a hawk and an eagle to scare birds such as doves and crows to inhibit the birds from approaching.

Furthermore U.S. Pat. No. 4,598,660 teaches a bird scaring device while Canadian Patent No. 1,228,480 teaches a bird scarer.

It is an object of this invention to provide an improved bird-scaring device, which is easy to assemble and use

DISCLOSURE OF INVENTION

It is an aspect of this invention to provide a device for scaring birds comprising a silhouette of a bird of prey having at least one hole there through; a first line having one end rotatably attached to said hole.

It is another aspect of this invention to provide a device for scaring birds comprising a thin vinyl sheet profiling a bird of prey, said sheet including two holes there through; first and second grommets for reinforcing said first and second holes; a first swivel connected to said first grommet; a second swivel connected to said second grommet; a first line having an end connected to said first swivel for rotatable movement thereabouts; a second line having an end connected to said second swivel for rotatable movement thereabouts; a safety line having one end connected to said first swivel and another end connected to said second swivel.

It is another aspect of this invention to provide a method of scaring birds comprising the steps of securing the silhouette of a bird of prey in position by connecting a first swivel to a first hole in said silhouette, connecting a first end of a first line to said first swivel, connecting a second swivel to a second hole in said silhouette, connecting a first end of a second line to said second swivel; reinforcing said silhouette from breakage by connecting one end of a safety line to said first swivel and another end of said safety line to said second swivel; moving said silhouette by wind so as to scare said birds.

BEST MODE FOR CARRYING OUT THE INVENTION

Figure 1:
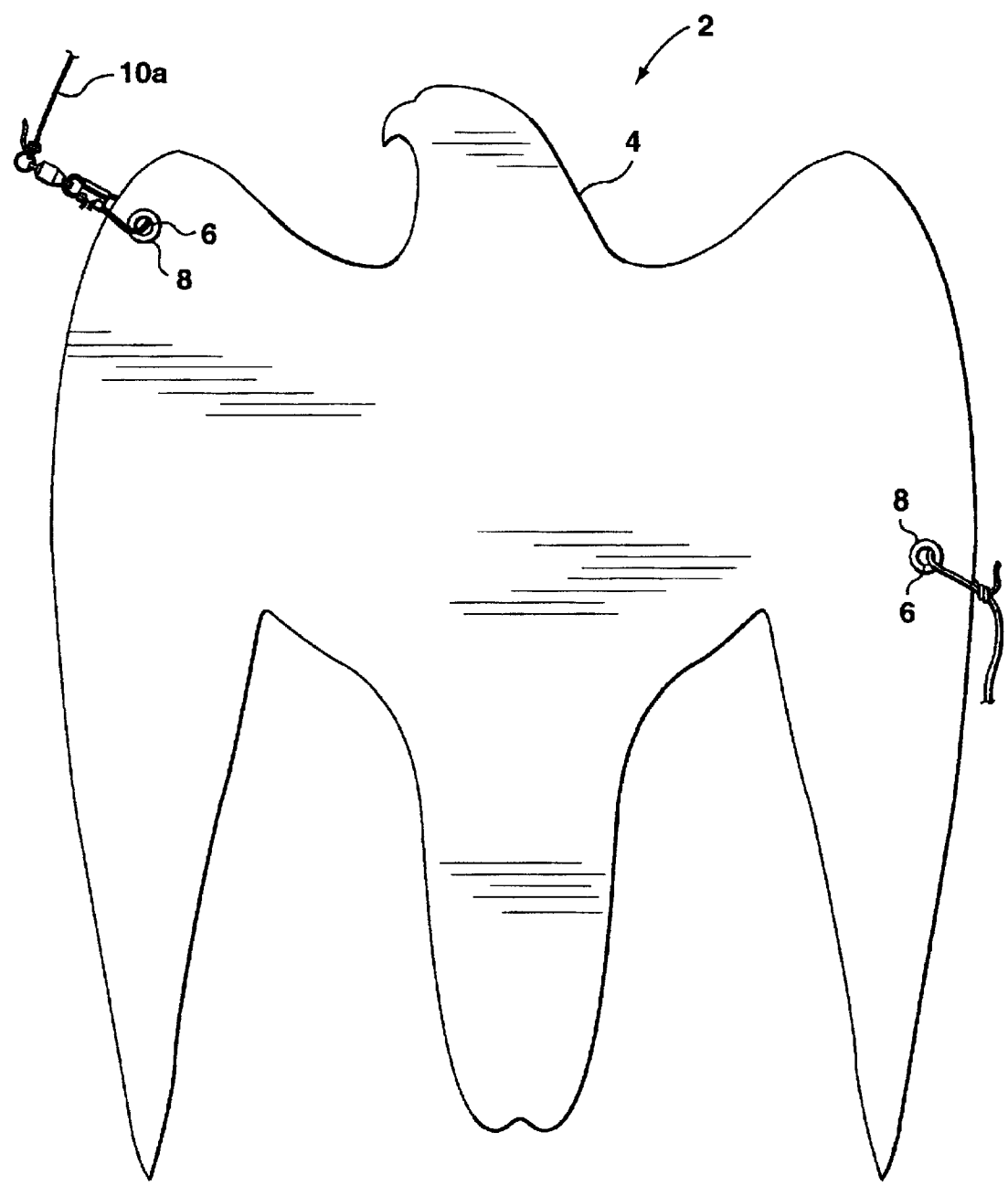
FIG. 1 is a representative view of a bird of prey.

In the description that follows, like parts are marked throughout the specification and the drawings with the same respective reference numerals. The drawings are not necessarily to scale and in some instances proportions may have been exaggerated in order to more clearly depict certain features of the invention.

Figure 2:
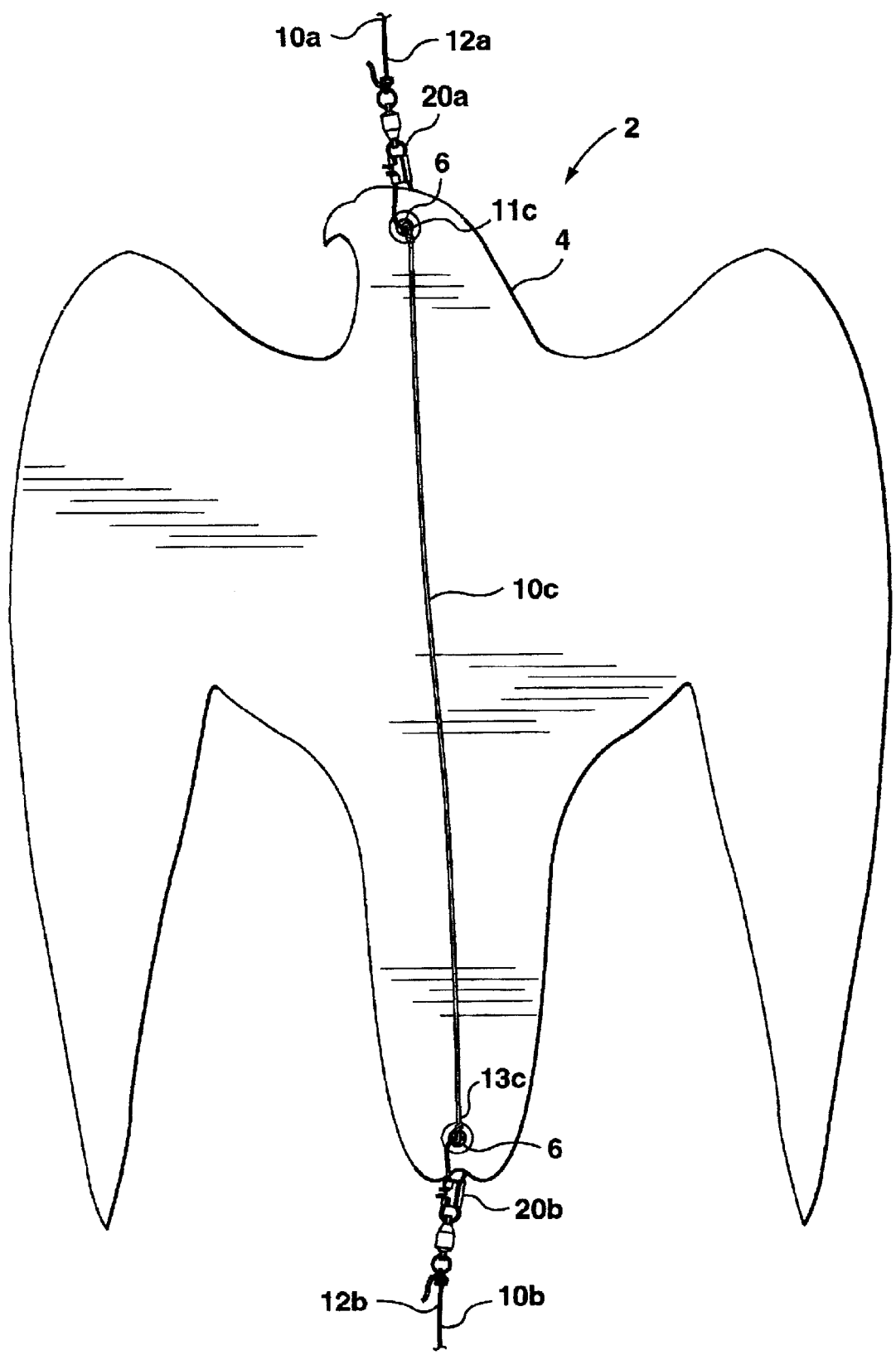
FIG. 2 is another embodiment of the invention showing the bird of prey.

This invention relates to a device 2 for scaring birds, which generally comprises of a silhouette 4 of a bird of prey such as disclosed in FIGS. 1 and 2 by way of example only. Examples of birds of prey include but are not limited to owls, peregrine falcons, falcons, eagles other birds of prey. Generally speaking birds such as seagulls, crows, swallows, starlings, blackbirds, robins, finches or the like are naturally scared by such birds of prey.

The representative silhouettes or profiles 4 of the bird of prey shown in FIGS. 1 and 2 are cut or stamped out from a vinyl sheet of material which is relatively thin such as for example from a black sheet of vinyl which may be 1/32 to 1/64 inch thick. However, other material can be used such as plastic, metal or the like. The outer profile or silhouette of the bird of prey is cut as shown for example in FIGS. 1 and 2 and such silhouette or profile 4 has at least one hole fixed there through. In the embodiment shown in FIGS. 1 and 2 there are at least two holes cut there through and are adapted to receive lines 10 for relative rotatable movement there between in the manner to be more fully described herein.

Each of the holes 6 includes a grommet 8 so as to reinforce the hole therein against tearing of the line 10. However, other reinforcing means can be used, such as thickening the area of the vinyl or the like.

Figure 3:
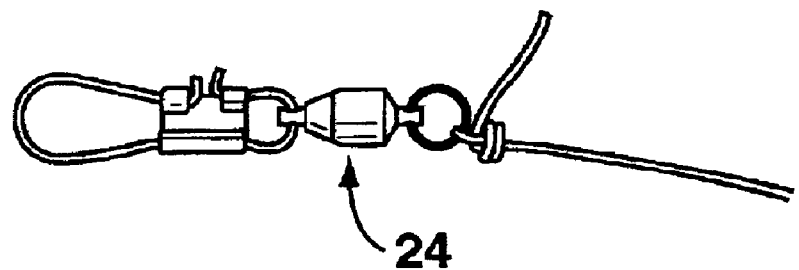
FIG. 3 is a representative view of a swivel in a closed position.
Figure 4:
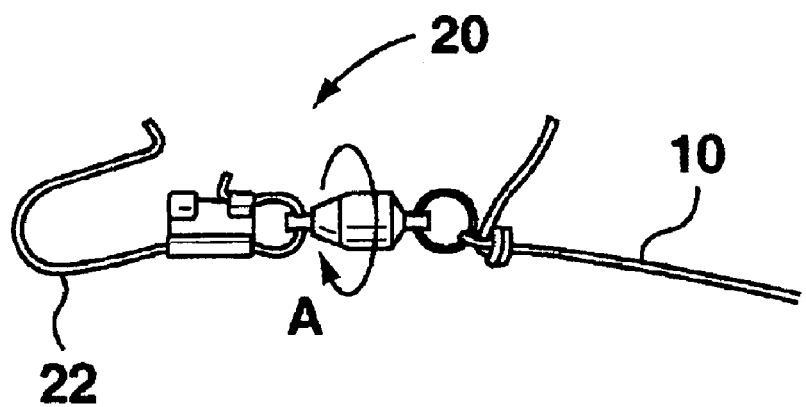
FIG. 4 is a representative view of a swivel in an open position.

In the embodiment shown in FIG. 1 the device 2 includes a first line 10a. As more fully shown in FIGS. 1 and 2 the first line 10a has one end 12a rotatably attached to the first hole 6. A second line 10b has one end 12b rotatably attached to the second hole 6. There is also a third line 10c which is rotatably attached to the first and second lines 10a and 10b. In particular the lines 12a and 12b are rotatably attached to the first and second holes 6, 6 by means of a swivel 20 which is illustrated in FIG. 3. The first swivel 20a is attached to the first hole 6 and the second swivel 20b is attached to the second hole 6. The swivel shown in FIG. 3 is a representative view of a swivel as other arrangements of swivels may be utilized within the spirit of this invention. The swivel 20 is characterized in that the swivel includes hole-attaching means 22 which in the arrangement shown in FIG. 3 comprises of a releasable clip 22 shown in the open position in FIG. 4. The clip 22 is adapted to be inserted into the hole 6 and then manipulated so as to be displaced in the locking position as shown in FIG. 3. In this way the swivel is secured to the hole 6 as shown in FIGS. 1 and 2. The swivel also includes rotatable means 24 which freely permits the rotatable means 24 to rotate in a direction A without tangling the line 10 relative to the hole 6.

The device 2 also includes a third safety line 10c which is rotatably attached to the first and second lines 10a and 10b as more fully shown in FIG. 2. In particular the safety line 10c is attached to the clip 22 and has been added so that if the line 10a rips away from the hole 6 then the entire line 10 is still secured and prevents the bird of prey from flapping in the wind. For example if there is severe stress applied unto the line 10 so as to cause the grommet 6 to rip through the vinyl material so that the line 10a or the first swivel 20a rips away from the first hole 6 there will still be continuity between the line 10a, 10b, and 10c so that the bird of prey does not fall to the ground or be left dangling in the wind.

Figure 5:
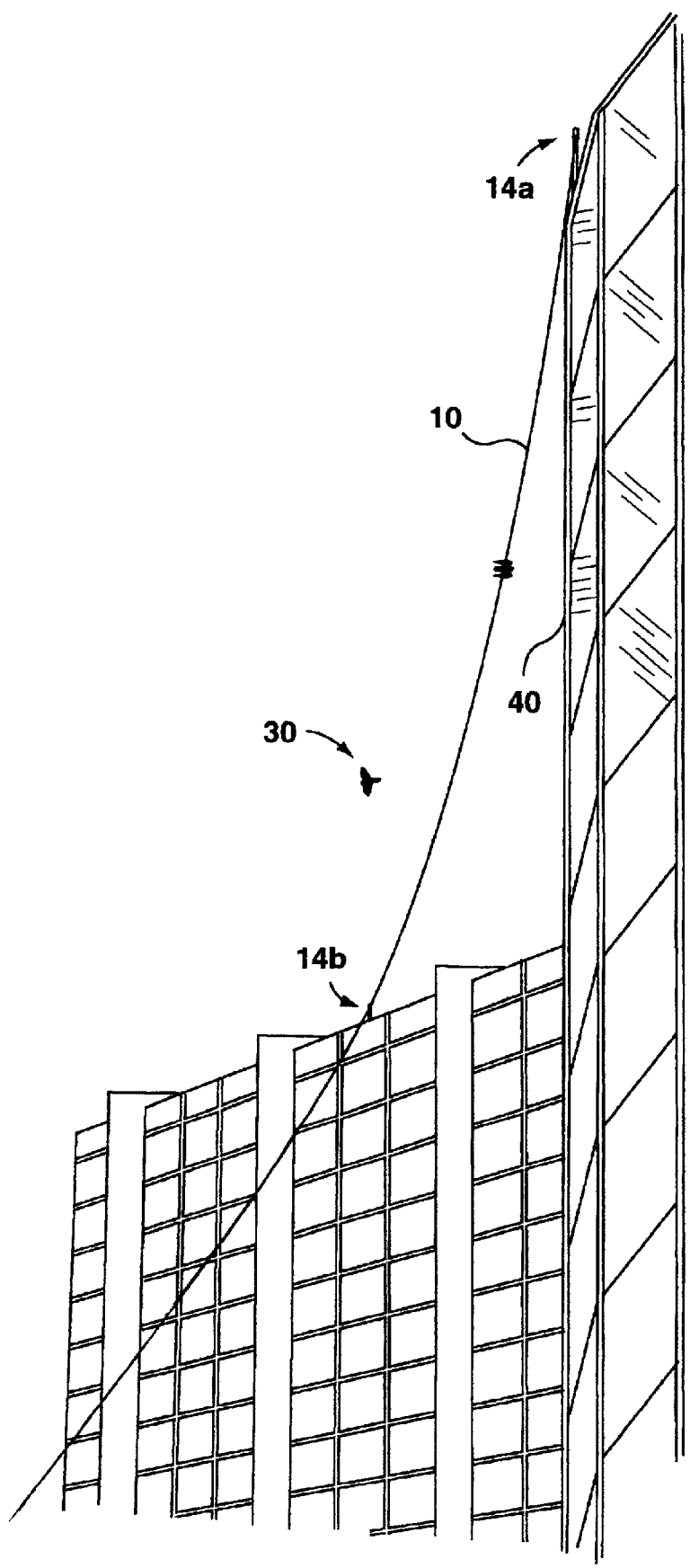
FIG. 5 is a representative view of the invention utilized in connection with a building.

One application of the device 2 described herein can be utilized so as to hang from a tall building as shown in FIG. 5. In such arrangement the first line 10a has another end 14a which is adapted to be attached above ground such as for example the top of a building, while the other end 14b has another end adapted to be attached in the ground or the like. In such arrangement the device 2 is secured as shown in FIG. 5 such that the wind or other airflows will cause the bird of prey to rotate about the line 10. Such rotation simulates the movement of a bird of prey and tends to scare of a bird 30. Furthermore since the device 2 is comprised of a vinyl material which is shiny this enhances the visibility of the bird of prey to the bird 30. Furthermore as the device 2 rotates about the line 10 the shiny surface of the bird of prey 2 will reflect light against the windows 40 of a building which reflects the image of the bird of prey against the windows 40 thus tending to enhance again the visibility of the bird of prey to the bird 30 so as to scare the bird 30 away. Furthermore each of the window panes can reflect an image of the lines so that instead of one bird of prey reflected there are a plurality of reflected bird's of prey.

By utilizing the swivels 20 the bird of prey, as it catches the wind, rotates about the line 10 in a random manner. By utilzing swivels 20 the bird of prey tends to rotate about the swivel 20 in the direction A which generally tends to be in a rotational direction generally perpendicular to the line 10. This swivel 20 tends to minimize the possibility of the bird of prey 2 from being entangled around the line 10 as it rotates and flaps in the wind. By utilizing the swivel 20 the bird of prey freely rotates around the line 10 and the chances of entangling the bird of prey 2 about the line is minimized.

Moreover by utilzing the safety line 10c one end of the safety line 11c is attached to the clip 22 of the first swivel 20a while another end 13c of the safety line 10c is attached to the clip 22 of the second swivel 20b. As stated above in the event that one of the swivels 20 or for that matter one of the grommets 8 rip away from the vinyl material the safety line 10c will continue to connect the first line 10a to the second line 10b so that the device 2 will remain in the air as shown in FIG. 5. This minimizes the possibility of the device 2 from falling down and hitting a passerby or the device 2 up in the air with the line broken.

The ends of the line 10 may be tied to the swivel 20 as shown while the safety line 10c may also be tied to the clips as shown.

Accordingly in the operation shown in FIG. 5 the device 2 will tend to scare away birds 30 minimizing the prospect of a bird 30 flying into the windows 40 of a building and thereby leaving a mess at the bottom thereof.

Figure 6:
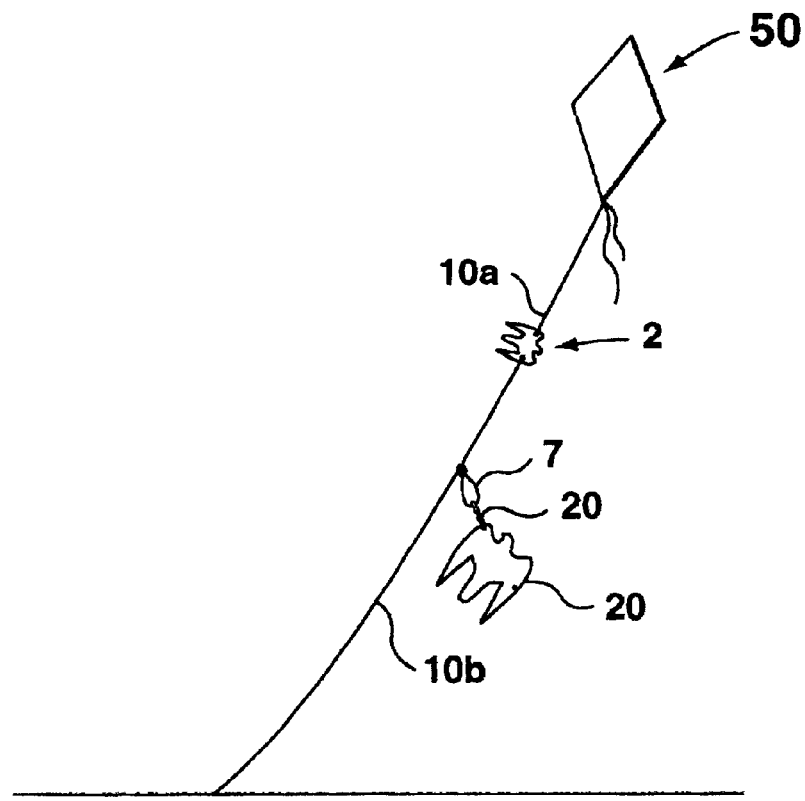
FIG. 6 is a representative view of the invention shown in connection with a kite.

Moreover the device 2 as described herein may be utilized in connection with a kite 60 as shown in FIG. 6. Such arrangement can be utilized so as to scare away birds from a crop such as grapes or the like. The arrangement shown in FIG. 6 works well; but FIG. 6 shows a further embodiment where a loop 7 can be incorporated in the line 10b with a swivel 20 and the device 2, which is useful when the tension is on the line that can pull apart the grommets. With the loop one minimizes the tension in the grommets.

Figure 7:
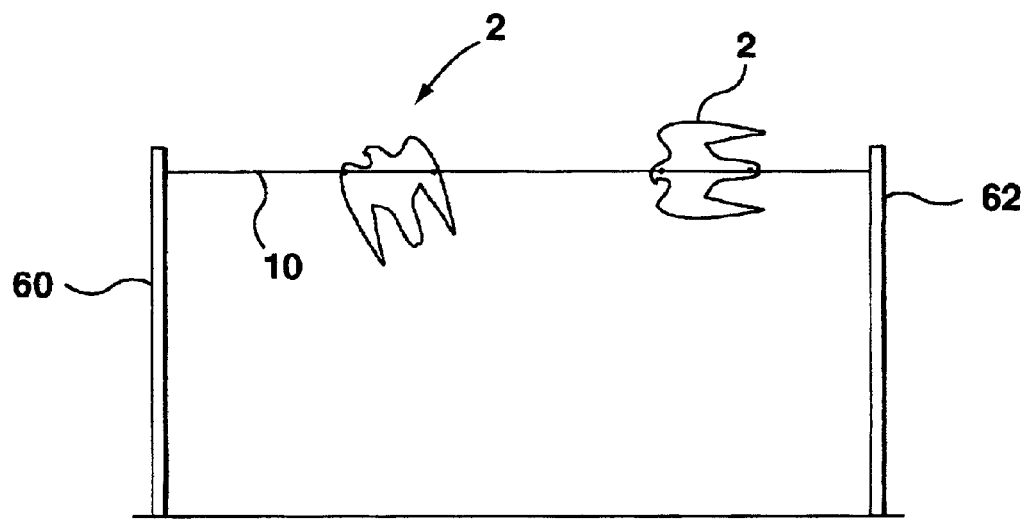
FIG. 7 is a representative view of the invention used in connection with two posts.

Another arrangement of the invention is shown in FIG. 7 whereby the line 10 is stretched across two posts 60 and 62 whereby the device 2 freely rotates relative to line 10 so as to scare birds or other pests away from a selected area such as crops or the like.

Figure 8:
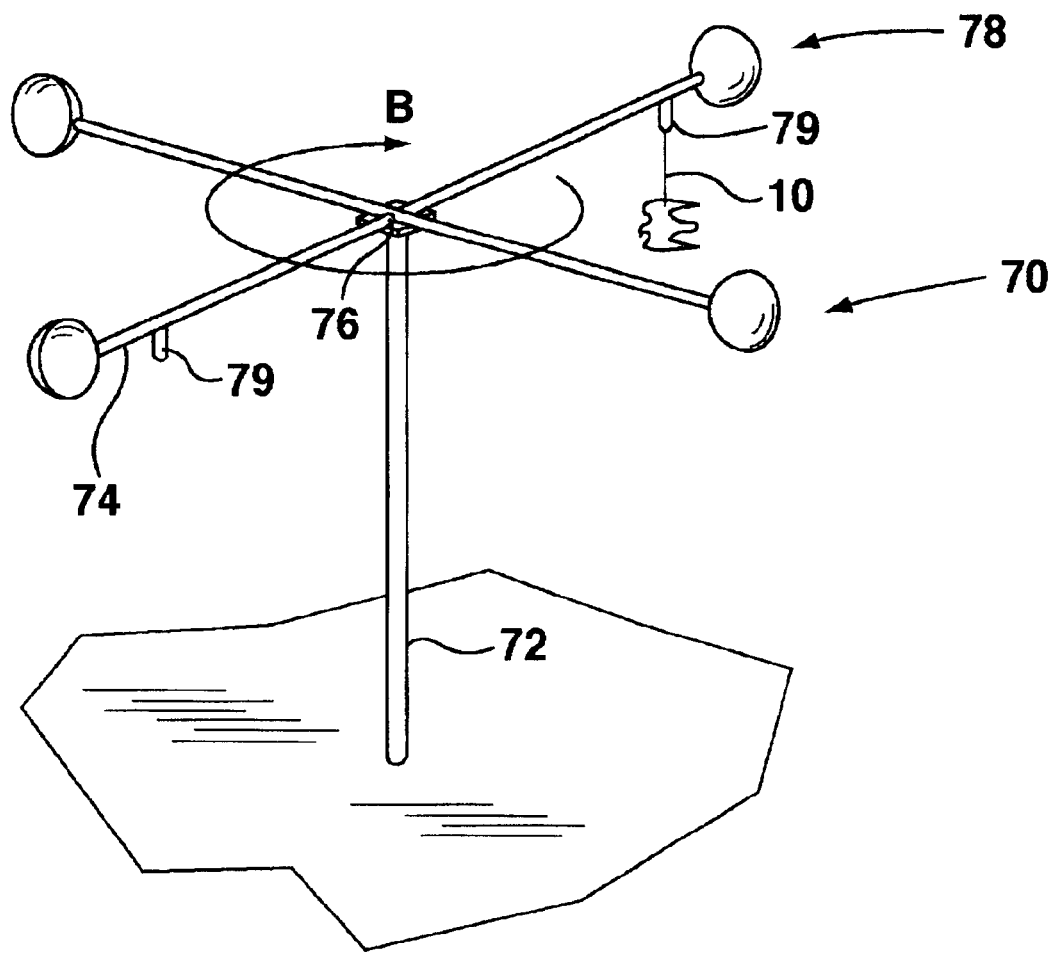
FIG. 8 is a representative view of the invention used in combination with apparatus for suspending and rotatably moving the device.

Furthermore other arrangements of the device 2 can be utilized in combination with an apparatus 70 for suspending and rotatably moving the device 2 thereabout as shown in FIG. 8. Such apparatus 70 can include a central post 72 with a plurality of extending arms 74 at the top end 76 thereof.

The extending arms 74 include wind moveable vanes 78, which are adapted to catch the wind and rotatably propel arms 74 about the post 72. The wind moving vanes 78 may be concave shaped or other similar shapes so as to propel the arms 74 about the central post 72 in the direction B.

As shown in FIG. 8 a first line 10a can be suspended from one of the arms 74 so as to cause the bird scaring device 2 to rotate about the post 72 and flap in the wind so as to scare birds away from a selected site such as a crop or grape field.

Although any suitable line 10 may be used such as nylon or the like good results are observed by using braided dracon line.

Moreover instead of using a kite as shown in FIG. 6 a helium balloon or the like may be used.

By utilzing the invention herein birds can be scared away from a desired location such as an airport, grape field, or away from buildings.

Various embodiments of the invention have now been described in detail. Since changes in and/or additions to the above-described best mode may be made without departing from the nature, spirit or scope of the invention, the invention is not to be limited to said details.

What is claimed is:

1. A device for scaring birds comprising:
    (a) a silhouette of a bird of prey having at least two holes therethrough;
    (b) a first swivel attached to one of said holes, and a second swivel attached to said other hole;
    (c) a first line having one end rotatably attached to said first swivel;
    (d) a second line having one end rotatably attached to said second swivel;
    (e) a third line having:
        (i) one end rotatably attached directly to one of said swivels; and
        (ii) another end rotatably attached directly to said other swivel for rotation of said third line relative said first and second lines without tangling said lines relative said holes and
so as to maintain continuity between said one end of said first and second lines respectively when said first and second lines become unattached from said holes respectively.

2. A device as claimed in claim 1 wherein said third line is selected to be substantially the length between said holes when connected to said first and second swivels.

3. A device as claimed in claim 2 wherein said silhouette comprises a vinyl panel having an outline of a bird of prey.

4. A device as claimed in claim 3 wherein said first line has another end adapted to be secured to an object above ground and said second line has another end adapted to be secured to the ground.

5. A device as claimed in claim 4 wherein said panel freely rotates about said first and second lines.

6. A device as claimed in claim 5 wherein said panel as colored and shiny and reflects light as said panel freely rotates about said line.

7. A device as claimed in claim 6 wherein said other end of said first line is adapted to be attached to the top of a building.

8. A device as claimed in claim 7 wherein said holes include grommets for reinforcing said holes.

9. A device for scaring birds comprising:
    (a) a thin vinyl sheet profiling a bird of prey, said sheet including first and second holes there through;
    (b) first and second grommets for reinforcing said first and second holes;
    (c) a first swivel connected to said first grommet, said first swivel including first rotatable means having first hole attaching means at one end and first line attaching means at another end;
    (d) a second swivel connected to said second grommet, said second swivel including second rotatable means having second hole attaching means at one end and second line attaching means at another end;
    (e) a first line having an end connected to said first line attaching means at said first rotatable means for rotatable movement thereabouts;
    (f) a second line having an end connected to said second line attaching means at said second rotatable means for rotatable movement thereabout;
    (g) a safety line having one end directly connected to said first swivel and another end directly connected to said second swivel for rotation of said third line relative said first and second lines without tangling said lines relative said holes.

10. A device as claimed in claim 9 wherein said first line has another end adapted to be attached to a building, and wherein said second line has another end adapted to be attached to the ground.

11. A device as claimed in claim 10 wherein said vinyl sheet is black and shiny and reflects light as said sheet rotates about said first and second lines so as to scare birds.

12. A device as claimed in claim 9 wherein said first line has another end adapted to be attached to a kite and wherein said second line has another end adapted to be attached to an object.

13. A device as claimed in claim 9 wherein said first line has another end adapted to an upright post, and wherein said second line has another end adapted to be attached to an upright post.

14. A device as claimed in claim 9 wherein said first, second and third lines comprise of a material selected from a group of nylon and braided dacron.

15. A device as claimed in claim 14 wherein said third line extends between said holes.

16. A device as claimed in claim 9 wherein said one end of said safety line is directly connected to said first hole attaching means of said first swivel and said other end of said safety line is directly attached to said second hole attaching means of said second swivel.

17. A method of scaring birds comprising the steps of:
    (a) securing the silhouette of a bird of prey in position by:
        (i) connecting one end of a first swivel to a first hole;
        (ii) connecting a first end of said first line to of said first swivel;
        (iii) connecting one end of a second swivel to a second hole;
        (iv) connecting a first end of said second line to said second swivel;

(b) reinforcing said silhouette from breakage by directly connecting one end of a safety line across said silhouette to said first swivel and directly connecting another end of said safety line to said second swivel;

(c) moving said silhouette by wind so as to scare said birds whereby said safety line rotates relative said first and second lines without tangling said lines relative said holes.

18. A method of scaring birds as claimed in claim 17 wherein another end of said first line is connected to the top of a building, and another end of said second line is connected to the ground, so as to scare birds away from a building.

19. A method of scaring birds as claimed in claim 17 wherein another end of said first line is connected to a kite, and another end of said second line is connected to an object so as to scare birds away from a field.

20. A method as claimed in claim 17 including the step of maintaining the continuity between said first end of said first line and said first end of said second line when said first and second lines become disconnected from said holes.

21. A method as claimed in claim 17 wherein the length of said safety line is selected to be substantially the length between said holes when said safety line is connected to said holes.

* * * * *